Nov. 22, 1927. 1,650,312
G. W. WILDIN ET AL
ANGLE COCK DEVICE
Filed May 7, 1926
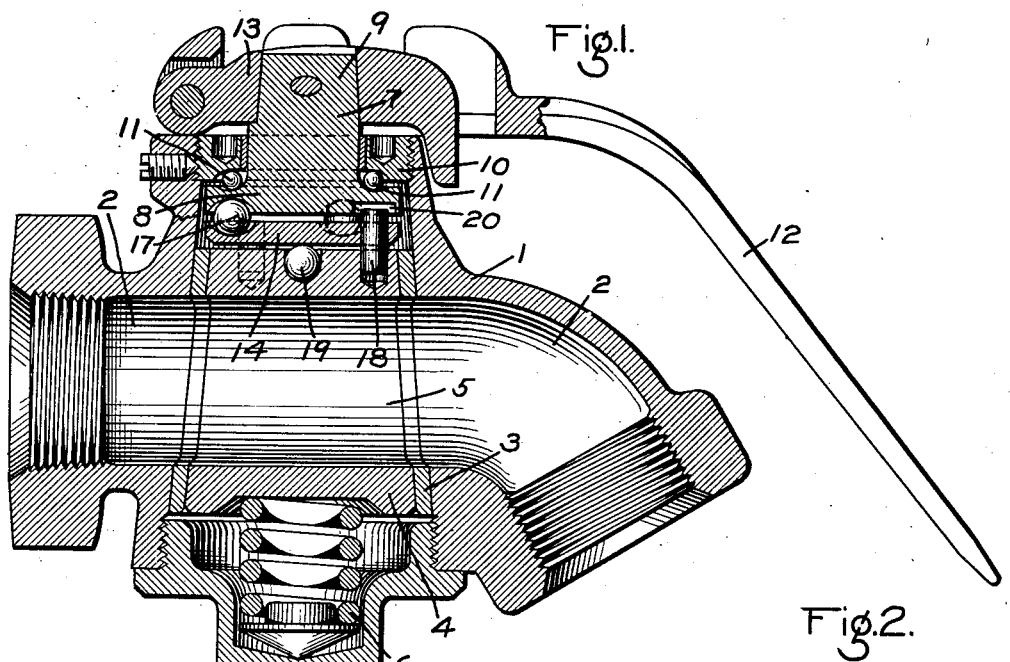
Fig.1.
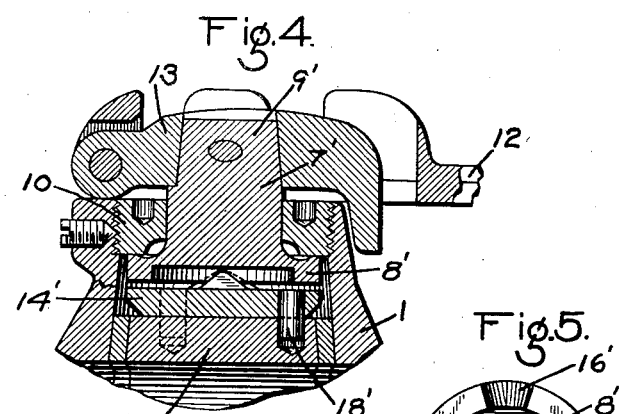
Fig.4.
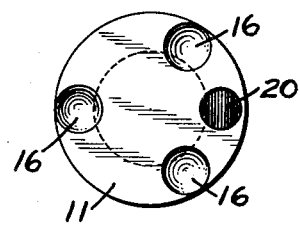
Fig.2.
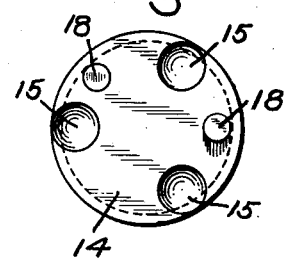
Fig.3.
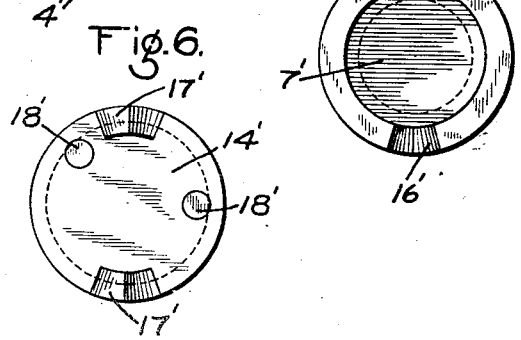
Fig.5.
Fig.6.
INVENTORS
GEORGE W. WILDIN
AND
CLYDE C. FARMER
BY
Wm. M. Cady
ATTORNEY Patented Nov. 22, 1927.

1,650,312

UNITED STATES PATENT OFFICE.

GEORGE W. WILDIN AND CLYDE C. FARMER, OF PITTSBURGH, PENNSYLVANIA, ASSIGNORS TO THE WESTINGHOUSE AIR BRAKE COMPANY, OF WILMERDING, PENNSYLVANIA, A CORPORATION OF PENNSYLVANIA.

ANGLE-COCK DEVICE.

Application filed May 7, 1926. Serial No. 107,362.

This invention relates to cocks, and more particularly to the type employing a rotatable tapered plug valve.

By reason of the wedge action exerted by a tapered plug valve on its seat, the turning of the valve on its seat is resisted with a force which oftentimes makes it necessary to use considerable hand power in order to turn the valve.
It has heretofore been proposed to provide means whereby the initial movement of the valve operating handle acts to move the valve slightly from its seat, so that the valve may be easily turned by a further movement of the handle.

The principal object of our invention is to provide improved means for facilitating the operation of a hand operated tapered plug valve.
In the accompanying drawing; Fig. 1 is a central sectional view of a tapered plug valve construction of the angle cock type and embodying our invention; Fig. 2 an inverted plan view of the valve operating member of the construction shown in Fig. 1; Fig. 3 a plan view of the pressure transmitting disk; Fig. 4 a sectional view of a portion of an angle cock device, showing a modified form of our invention; Fig. 5 an inverted plan view of the valve operating member shown in Fig. 4; and Fig. 6 a plan view of the pressure transmitting disk employed in the Fig. 4 construction.

As shown in Fig. 1, the construction comprises a valve body 1 having a fluid conduit 2 and having a tapered opening containing a tapered bushing 3 provided with a seat for a tapered plug valve 4. The valve 4 is provided with a port 5 which is adapted to establish communication through the conduit 2 when the valve is in its open position, and said valve is subject to the pressure of a coil spring 6 which tends to hold the valve seated.

Disposed at the upper end of the tapered opening in the valve body 1 is a valve operating member 7 having an annular flange 8 and a key section 9. Said member is held in place by a threaded ring 10 and interposed between said ring and the flange 8 is a ball bearing having bearing balls 11.

Though not essential to the invention, the valve is shown as operable by means of a pivoted locking handle 12, which is pivotally connected to a member 13 secured to the key section 9, so that when the handle 12 is lifted and rotated, the valve 4 will likewise be rotated.

Interposed between the member 7 and the valve 4 is a disk 14 having a plurality of cavities 15 on one face, adapted to register with corresponding cavities 16 in the under face of the member 7. A ball 17 is mounted in each pair of cavities, of such diameter that the disk 14 and the member 7 are slightly spaced apart.

The disk 14 is caused to rotate with the valve 4 by means of pins 18, which extend into recesses formed in the valve. One of said pins also extends upwardly into an enlarged recess 20 formed in the under face of the flange 8. Mounted in a recess disposed centrally at the upper face of the valve 4 is a ball 19 which extends above the face of the valve so as to engage the disk 14.

In operation, when the member 7 is rotated by the handle 12, the initial rotative movement tends to cause the balls 17 to ride up the side walls of the containing cavities 15 and 16 and thereby, a downward thrust is exerted on the valve 4, which operates to slightly unseat the valve and break the frictional contact between the valve and its seat. The further rotative movement of the handle 12 then effects the turning of the valve 4, unopposed by frictional resistance due to the engagement of the valve on its seat.

Instead of employing the balls 17 of the construction shown in Fig. 1, wedges may be used, as shown in Fig. 4. In this case, the disk 14' is provided with wedge shaped projecting portions 17' which engage in corresponding wedge shaped recesses 16' in the member 7'. Otherwise the construction is similar to that shown in Fig. 1, and operates in substantially the same manner.

By employing the ball 19 in the construction shown in Fig. 1, the transmission of pressure from the key member 7 to the valve 4 is equalized, since said ball permits the disk 14 to adjust itself for any inequalities and ensures that the thrust will be transmitted through the rotative axis of the valve.

One of the dowel pins 18 extending into the enlarged recess 20 in the member 7, ensures that the parts will be correctly assembled and at the same time, if through wear, or faulty adjustment, the wedging members should fail to wedge so as to effect rotation of the valve, then the pin 18 will engage the side walls of the recess 20 and the valve will be rotated by the pin 18.

Having now described our invention, what we claim as new and desire to secure by Letters Patent, is:—

1. In a plug valve device, the combination with a valve body and a plug valve having a seat in said body, of a key member, a disk interposed between said member and said valve, wedging means interposed between said member and said disk, and a ball mounted in said valve and engaging said disk.

2. In a plug valve device, the combination with a valve body and a plug valve having a seat in said body, of a key member, a disk interposed between said member and said valve, wedging means interposed between said member and said disk, and a ball mounted in a central recess at the upper face of said valve and engaging said disk.

3. In a plug valve device, the combination with a valve body and a plug valve having a seat in said body, of a key member, a disk interposed between said member and said valve, wedging means interposed between said member and said disk, and dowel pins carried by said disk and extending into corresponding recesses in said valve, one of said pins extending into an enlarged recess in said key member, to provide for rotation of the valve in case the wedging means should fail.

In testimony whereof we have hereunto set our hands.

GEORGE W. WILDIN.
CLYDE C. FARMER.